United States Patent
Driscoll et al.

(10) Patent No.: US 11,030,021 B1
(45) Date of Patent: Jun. 8, 2021

(54) VARIABLE SELECTION OF DIFFERENT VERSIONS OF AN EVENT HANDLER

(71) Applicant: TRACELINK, INC., North Reading, MA (US)

(72) Inventors: Christopher Driscoll, Methuen, MA (US); Robert Sturim, Wenham, MA (US); Andy Nanopoulos, Wakefield, MA (US)

(73) Assignee: TRACELINK, INC., North Reading, MA (US)

( * ) Notice: Subject to any disclaimer, the term of this patent is extended or adjusted under 35 U.S.C. 154(b) by 0 days.

(21) Appl. No.: 16/930,554

(22) Filed: Jul. 16, 2020

(51) Int. Cl.
*G06F 9/54* (2006.01)

(52) U.S. Cl.
CPC .................................... *G06F 9/542* (2013.01)

(58) Field of Classification Search
None
See application file for complete search history.

(56) References Cited

U.S. PATENT DOCUMENTS

| | | | | |
|---|---|---|---|---|
| 2003/0163598 A1* | 8/2003 | Wilson | ..................... | G06F 9/542 719/318 |
| 2014/0075445 A1* | 3/2014 | Wang | ........................ | G06F 9/50 718/104 |
| 2017/0078298 A1* | 3/2017 | Vlaminck | ........... | H04L 12/2807 |
| 2017/0085512 A1* | 3/2017 | Bray | ....................... | H04L 51/22 |
| 2017/0357555 A1* | 12/2017 | Saitoh | ..................... | G06F 9/485 |
| 2018/0083826 A1* | 3/2018 | Wilson | ................ | H04L 41/0604 |
| 2019/0196886 A1* | 6/2019 | Chen | ........................ | G06F 8/30 |
| 2019/0238456 A1* | 8/2019 | Wang | ....................... | H04L 45/46 |
| 2019/0310899 A1* | 10/2019 | Oravivattanakul | ..... | G06F 21/62 |
| 2020/0097342 A1* | 3/2020 | Chandrasekaran | ..... | G06F 9/542 |

* cited by examiner

*Primary Examiner* — Charles E Anya
(74) *Attorney, Agent, or Firm* — Steven M. Greenberg, Esq.; Shutts & Bowen LLP

(57) ABSTRACT

Embodiments of the present invention provide a method, system and computer program product for variable event handling in a multi-tenant environment. In an embodiment of the invention, a method for variable event handling in a multi-tenant environment includes receiving an event placed on an event bus in an event driven data processing system, the event corresponding to a multiplicity of different instances of a single event handler, with each instance having been adapted to process the event. The method additionally includes decoding the event to identify a version of a target application for the event and matching the version of the target application to an end point for a particular one of the different event handlers. Finally, the method includes routing the event to the matched end point.

9 Claims, 2 Drawing Sheets

VARIABLE SELECTION OF DIFFERENT VERSIONS OF AN EVENT HANDLER

BACKGROUND OF THE INVENTION

Field of the Invention

The present invention relates to the field of multi-tenant computing and more particularly to event handling in a multi-tenant computing environment.

Description of the Related Art

Traditional computing includes the execution of a computer program in memory of a computer by a processor of the computer. Ordinarily, a single user accesses a corresponding single computer program at any one time; however, some multi-user computer programs permit the simultaneous access of the computer program and the data produced and accessible therein. Within a single organization, supporting a multi-user computer program makes sense. In this regard, within a single organization, data sharing is permitted and thus, each individual accessing the multi-user computer program may be permitted to access the same data. As well, to the extent that different users within the same organization enjoy different access rights to different data, certain portions of the data can be restricted from access for different users.

The computing resources required to support the execution of a single application generally are limited and therefore manageable. Even for a small organization, maintaining a minimal closet of computing resources is only a small burden. But, to support the execution of multiple computer programs so as to accommodate a large number of simultaneous users within an organization, a large number of computing resources are required. As such, many organizations elect to outsource the hosting of physical computing resources to a remote, managed site. As well, to the extent that different users within an organization may be geographically dispersed, hosting multiple computing resources in a centrally disposed location or even at multiple different locations can be of great importance.

Notwithstanding, despite the efficiencies gained by remotely positioning one's own multi-user computer programs in a hosted server farm, managed, hosted services can be quite costly—especially in terms of software licensing fees. Consequently, modern trends in computing capitalize on the notion of a multi-tenant computing environment. A multi-tenant computing environment is a hosted computing environment in which a single instance of a computer program executes in a centralized computing infrastructure while remaining accessible to multiple different users across multiple different organizations. In particular, in comparison to a multi-instance architecture, in a multi-tenant environment, each tenant is a group of users sharing common access with specific privileges to a single instance of the computer program. Each tenant then enjoys a dedicated share of the single instance of the computer program, including corresponding data, configuration, user management, tenant individual functionality and non-functional properties.

The fundamental concern in the subscription to a hosted, multi-tenant environment begins and ends with data security. An organization subscribing to an application instance in a multi-tenant environment must be assured of the security of organizational data from access by other organizations also subscribing to the same application instance. Consequently, the typical multi-tenant environment segregates organizational data in different, separate database stores so that one organization is not permitted to access the database store of another. As well, data communications between different users of different organizations of the single application instance remain separate from one another, with each organization having its own set of communication channels established with the single instance of the application.

It is a distinct advantage of the multi-tenancy architecture that all subscribers, also known as "tenants", receive access to a most recent version of a commonly accessed application since updating the application for one tenant necessarily means updating the application for all tenants. However, it is a less obvious, but equally important disadvantage of a multi-tenant environment that all subscribers are compelled to use an identical version of an application since all subscribers access the same instance of the same application at any given time. Consequently, to the extent that one of the subscribers, e.g. tenants, seeks to access a legacy or slightly older version of an application, that subscriber is then forced to access a completely different instance of the application outside of the multi-tenancy architecture or within a completely separate multi-tenancy architecture. As such, inefficiently, the application manager must then manage two different deployments of the same application in a hosted environment.

BRIEF SUMMARY OF THE INVENTION

Embodiments of the present invention address deficiencies of the art in respect to event handling in a multi-tenant computing environment, and provide a novel and non-obvious method, system and computer program product for variable event handling in a multi-tenant environment. In an embodiment of the invention, a method for variable event handling in a multi-tenant environment includes receiving an event placed on an event bus in an event driven data processing system, the event corresponding to a multiplicity of different instances of a single event handler for respectively different versions of a target application, with each instance having been adapted to process the event. The method additionally includes decoding the event to identify a version of the target application for the event and matching the version of the target application to an end point for a particular one of the different event handlers. Finally, the method includes routing the event to the matched end point.

In one aspect of the embodiment, the event is received in the event bus in connection with an event name and, optionally, the event version, the target application and an owner or deployer of the target application. As such, the matching utilizes the event name, target application and owner as a key into a routing table stored in cache memory of the event driven data processing system in order to identify the end point. In this aspect, the end point may include a location prefix appended to the event name, so that the routing inserts the event name with prefix onto the event bus.

For instance, the location prefix can include a concatenation of a deployment identifier, an archive identifier and an application identifier. Optionally, in the event of data loss, the method can include dynamically reconstruct the routing table. Specifically, following data loss in the event driven data processing system, the method additionally includes querying each instance of the target application and, thereafter, receiving in response to the querying from each corresponding instance of the target application, the deployment identifier, archive identifier and application identifier for each owner subscribing to the corresponding instance of the target application. For each owner, a record is created in the routing table correlating the owner, application identifier and event with the deployment identifier, archive identifier and application identifier.

In another embodiment of the invention, a data processing system is adapted for variable event handling in a multi-tenant environment. The system includes a host computing platform that includes one or more computers, each with memory and at least one processor. The system also includes a variable event handling module. The module includes computer program instructions enabled, while executing in the host computing platform, to receive an event placed on an event bus in an event driven data processing system, the event corresponding to a multiplicity of different instances of a single event handler, each instance having been adapted to process the event. The computer program instructions additionally decode the event to identify a version of the target application for the event and match the target application to an end point for a particular one of the different event handlers. Finally, the program instructions route the event to the matched end point.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for variable event handling in a multi-tenant environment. In accordance with an embodiment of the invention, a number of different versions of an application execute in a multi-tenant computing environment with each of the versions formed in part from a collection of different event handlers, each adapted to process events received on an event bus in the computing environment. As such, different versions of the application differ based upon different arrangements of the event handlers, with some of the event handlers having programming sufficient to process the same event, albeit according to different program logic. To properly route a particular event on the event bus to the correct event handler, then, a received event may be decoded to identify a particular one of the versions implicated by the event so that a specific end point address for a correct one of the event handlers for the event corresponding to the particular version may receive the event for processing. In this way, multiple different tenants are able to access different versions of the same application within the same multi-tenant computing environment by posting the same events onto the event bus of the environment without regard to the specific versions of the application targeted by the events.

Figure 1:
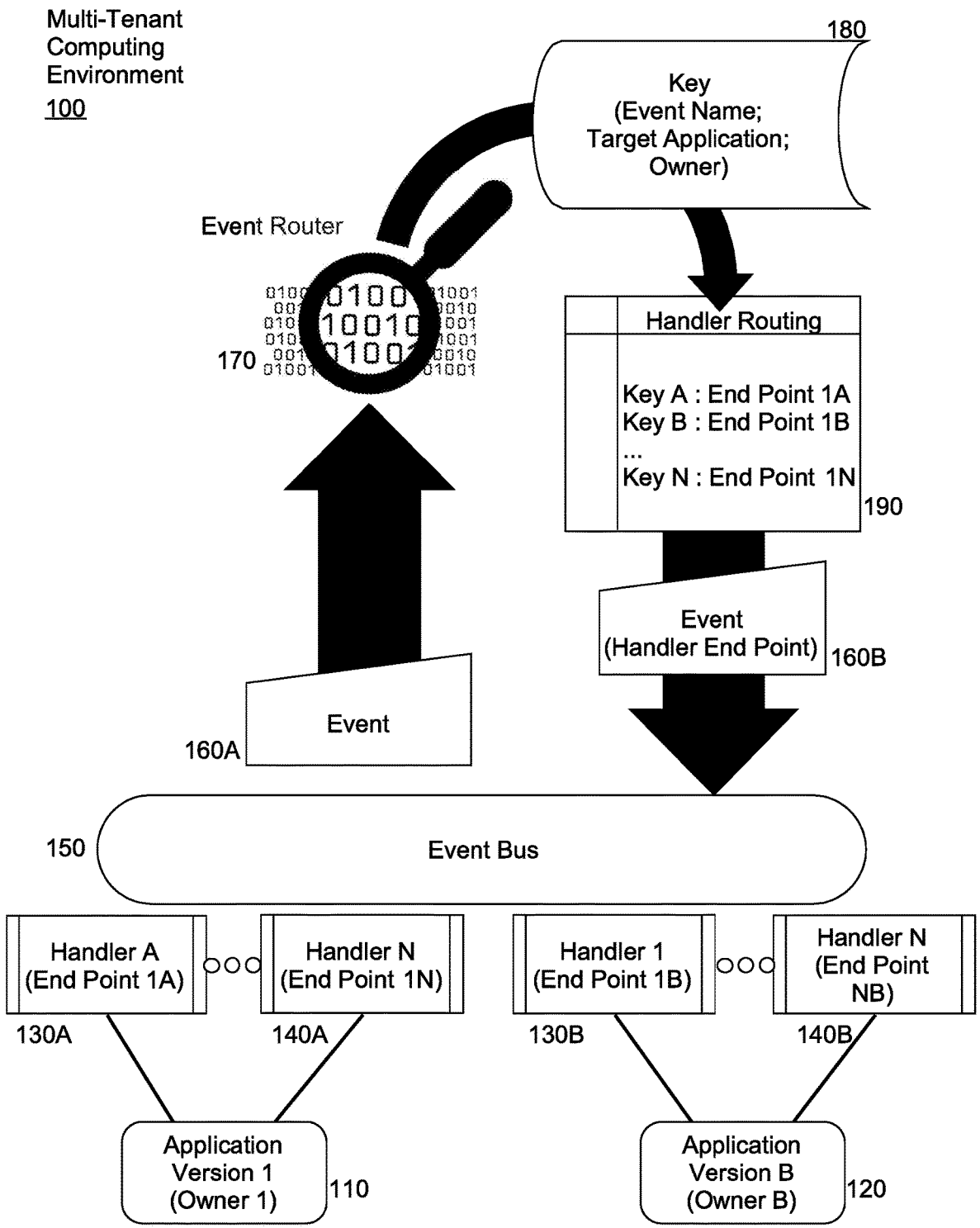
FIG. 1 is pictorial illustration of a process for variable event handling in a multi-tenant environment.

In further illustration, FIG. 1 is pictorial illustration of a process for variable event handling in a multi-tenant environment. As shown in FIG. 1, a multi-tenant computing environment 100 hosts different applications versions 110, 120 of a singular application. Each of the different versions 110, 120 includes a corresponding combination of different event handlers 130A, 130B, 140A, 140B. Selected ones of the different event handlers 130A, 130B are configured to process a common event. In this way, multiple different versions 110, 120 of the same application execute concurrently in the multi-tenant computing environment 100 by varying different ones of the event handlers 130A, 130B, 140A, 140B to process common events.

In operation, an event 160A is placed onto an event bus 150 in the multi-tenant computing environment 100. An event router 170 receives the event 160A on the event bus 150 and extracts therefrom an event name for the event, a target application for the event and an application owner for the target application. The event router 170 then combines the event name, target application and application owner into a key 180 and submits the key 180 as a query to an event handler routing table 190. In response to the query, the event router 170 receives an end point corresponding to the key 180.

In this regard, the event router 170 receives from the event handler routing table 190 a combination of a deployment identifier, archive identifier and target application identifier. The event router 170 combines the foregoing into a prefix and concatenates the prefix with the event to produce an endpoint 160B. Finally, the event router 170 places the endpoint 160B onto the event bus 150 for processing by one of the event handlers 130A, 130B, 140A, 140B adapted to process the event 160A.

Figure 2:
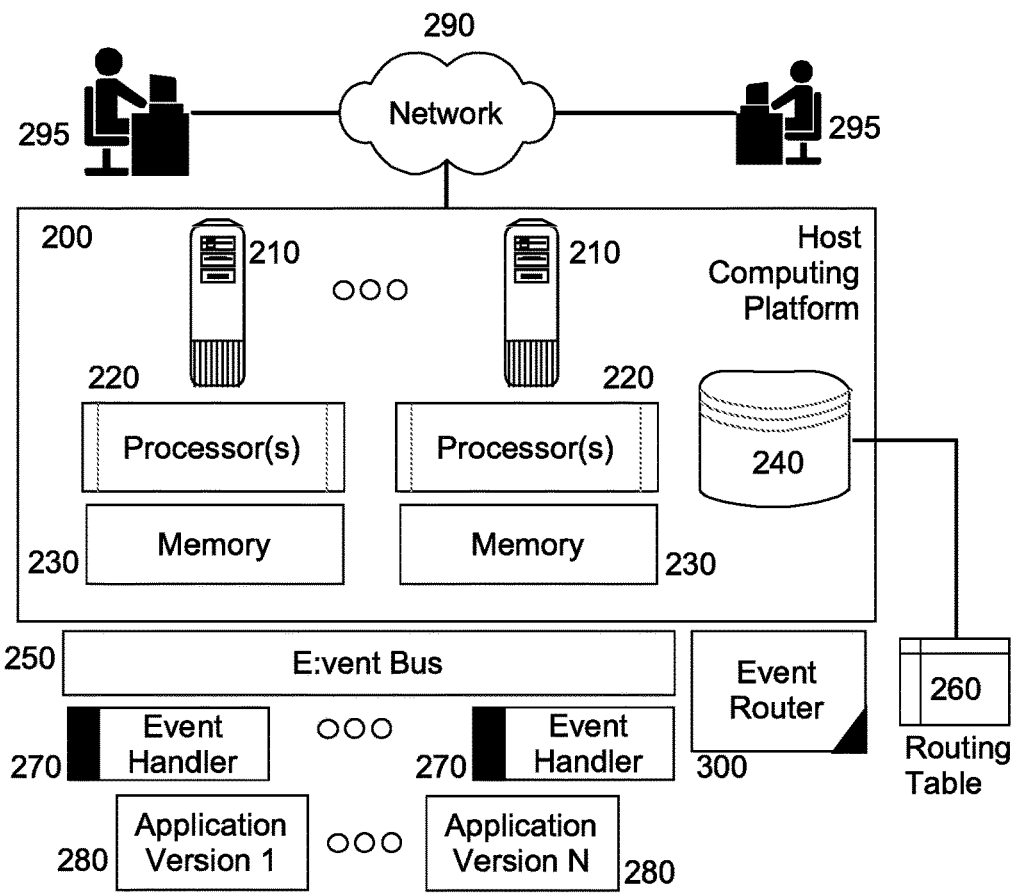
FIG. 2 is a schematic illustration of a multi-tenant computer data processing system configured or variable event handling; and, FIG. 3 is a flow chart illustrating a process for variable event handling in a multi-tenant environment.

The process set forth in connection with FIG. 1 may be implemented in a computer data processing system. In further illustration, FIG. 2 is a schematic illustration of a multi-tenant computer data processing system configured or variable event handling. The system includes a host computing platform 200 accessible from over computer communications network 290 by different remote end users 295 and that includes one or more computers 210, each with one or more processors 220 and memory 230. The host computing platform 200 also includes memory 240 storing therein a routing table 260. The routing table 260 includes a set of records correlating individual keys with corresponding routing data, the keys each including an identification of an event and an application owner for the target application and the routing data including an indication of a deployment identifier, archive identifier and target application identifier.

The host computing platform 200 supports a multi-tenant computing environment in which different versions 280 of an application, each version defined by different combinations of the different event handlers 270, shown, each executing in the memory 230 of the host computing platform 200. In this regard, different ones of the event handlers 270 are adapted to process the same event when placed on the event bus 250 with an event router 300 querying the routing table 260 to determine an endpoint for a selected one of the event handlers 270 to process a given event. The event router 300 determines the endpoint based upon a key assembled from a combination of an identification of the given event and an application owner of a target application included with the given event. The event router 300 then places the determined endpoint onto the event bus 250 for processing by the selected one of the event handlers 270.

Figure 3:
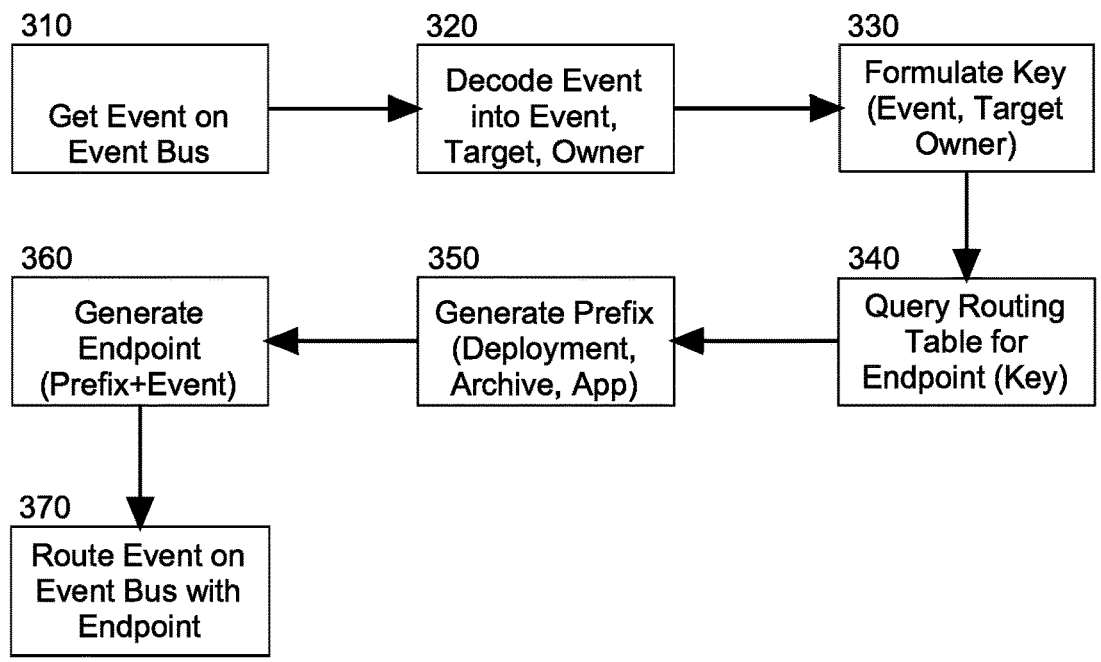

In even yet further illustration of the operation of the event router 300, FIG. 3 is a flow chart illustrating a process for variable event handling in a multi-tenant environment. Beginning in block 310, an event is received on the event bus and in block 320, the event is decoded into an event identifier, a target application identifier, and an identifier of an application owner of the target application. Then, in block 330 a key is formulated with a combination of the event identifier, target application identifier and application owner identifier.

In block 340, a routing table is queried with the key in order to retrieve a record specifying a deployment identifier of a specified event handler, an identifier of an archive containing the specified event handler and an identifier of the target application to which the specified event handler belongs. In block 350, the foregoing deployment identifier, identifier of an archive and identifier of the target application are combined into a prefix which is then concatenated with the event in block 360 so as to form an endpoint. Finally, in block 370, the event is routed to the specified event handler accessible at a location resolvable by the endpoint. In this way, multiple different versions of an application can co-exist in the same multi-tenant environment so as to accommodate different end users utilizing different ones of the versions concurrently.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for variable event handling in a multi-tenant environment comprising:

receiving an event placed on an event bus in an event driven data processing system in connection with an event name, a version of a target application and an owner of a version of the target application, wherein the event corresponds to a multiplicity of different instances of a single event handler, and wherein each instance being adapted to process the event;

decoding the event to identify a version of a target application for the event;

matching the version of the target application to an end point for a particular one of the different event handlers, wherein the end point comprise a location prefix appended to the event name, the matching utilizing the event name, version of the target application and owner as a key into a routing table stored in cache memory of the event driven data processing system to identify the end point; and, routing the event to the matched end point by inserting the event name with prefix onto the event bus.

2. The method of claim 1, wherein the location prefix comprises a concatenation of a deployment identifier, an archive identifier and an application identifier.

3. The method of claim 2, further comprising dynamically reconstructing the routing table following data loss in the event driven data processing system by querying each instance of the target application in receiving in response to the querying from each corresponding instance of the version of the target application, the deployment identifier, archive identifier and application identifier for each owner subscribing to the corresponding instance of the version of the target application.

4. A data processing system adapted for variable event handling in a multi-tenant environment, the system comprising:

a host computing platform comprising one or more computers, each comprising memory and at least one processor; and, a variable event handling module comprising computer program instructions enabled while executing in the host computing platform to perform:

receiving an event placed on an event bus in an event driven data processing system in connection with an event name, a version of a target application and an owner of a version of the target application, wherein the event corresponds to a multiplicity of different instances of a single event handler, and wherein each instance being adapted to process the event;

decoding the event to identify a version of a target application for the event;

matching the version of the target application to an end point for a particular one of the different event handlers, wherein the end point comprise a location prefix appended to the event name, the matching utilizing the event name, version of the target application and owner as a key into a routing table stored in cache memory of the event driven data processing system to identify the end point; and, routing the event to the matched end point by inserting the event name with prefix onto the event bus.

5. The system of claim 4, wherein the location prefix comprises a concatenation of a deployment identifier, an archive identifier and an application identifier.

6. The system of claim 5, further comprising dynamically reconstructing the routing table following data loss in the event driven data processing system by querying each instance of the version of the target application in receiving in response to the querying from each corresponding instance of the version of the target application, the deployment identifier, archive identifier and application identifier for each owner subscribing to the corresponding instance of the version of the target application.

7. A computer program product for variable event handling in a multi-tenant environment, the computer program product including a non-transitory computer readable storage medium having program instructions embodied therewith, the program instructions executable by a device to cause the device to perform a method including:

receiving an event placed on an event bus in an event driven data processing system in connection with an event name, a version of a target application and an owner of a version of the target application, wherein the event corresponds to a multiplicity of different instances of a single event handler, and wherein each instance being adapted to process the event;

decoding the event to identify a version of a target application for the event;

matching the version of the target application to an end point for a particular one of the different event handlers, wherein the end point comprise a location prefix appended to the event name, the matching utilizing the event name, version of the target application and owner as a key into a routing table stored in cache memory of the event driven data processing system to identify the end point; and, routing the event to the matched end point by inserting the event name with prefix onto the event bus.

8. The computer program product of claim 7, wherein the location prefix comprises a concatenation of a deployment identifier, an archive identifier and an application identifier.

9. The computer program product of claim 8, wherein the method further includes dynamically reconstructing the routing table following data loss in the event driven data processing system by querying each instance of the target application in receiving in response to the querying from each corresponding instance of the target application, the deployment identifier, archive identifier and application identifier for each owner subscribing to the corresponding instance of the version of the target application.

* * * * *